R. H. BLANCHARD.
HARD RUBBER BATTERY CELL AND PROCESS FOR MAKING SAME.
APPLICATION FILED APR. 20, 1920.
1,380,520.
Patented June 7, 1921.
2 SHEETS—SHEET 1.
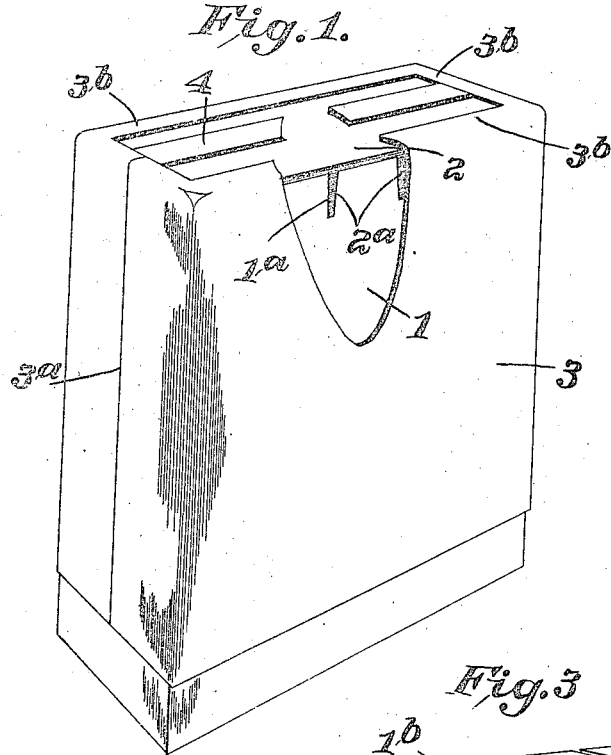
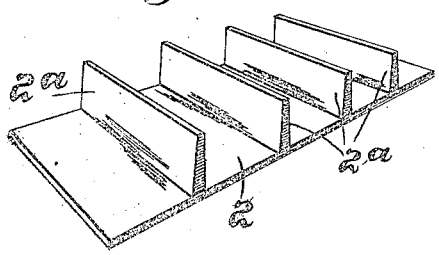
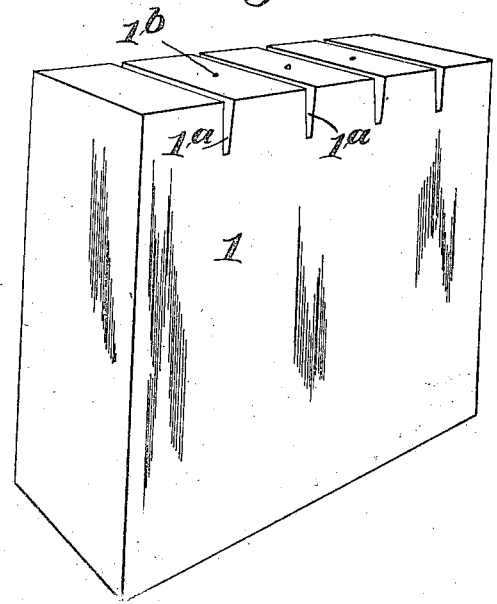
Raymond H. Blanchard,
INVENTOR
BY
ATTORNEYS

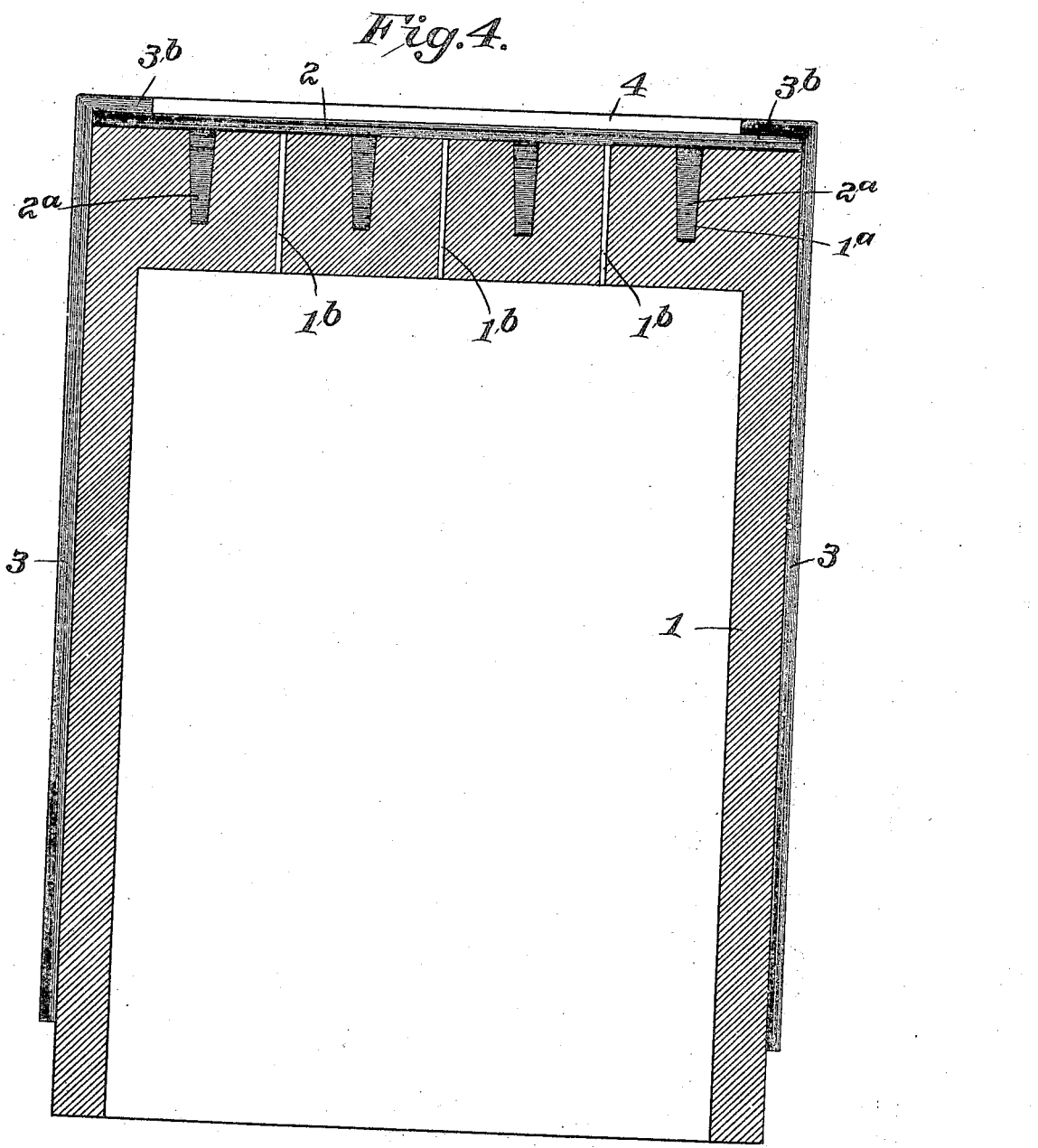

UNITED STATES PATENT OFFICE.

RAYMOND H. BLANCHARD, OF MALDEN, MASSACHUSETTS, ASSIGNOR TO HOOD RUBBER COMPANY, OF WATERTOWN, MASSACHUSETTS, A CORPORATION OF MASSACHUSETTS.

HARD-RUBBER BATTERY-CELL AND PROCESS FOR MAKING SAME.

1,380,520. Specification of Letters Patent. Patented June 7, 1921.

Application filed April 20, 1920. Serial No. 375,223.

*To all whom it may concern:*

Be it known that I, RAYMOND H. BLANCHARD, a citizen of the United States, and resident of Malden, county of Middlesex, State of Massachusetts, have invented certain new and useful Improvements in Hard-Rubber Battery-Cells and Processes for Making Same, of which the following is a specification.

My present invention relates to improvements in hard rubber battery cells and the process of making the same.

The object of the invention is to enable such cells to be manufactured at reduced expense as regards labor and loss on account of defective articles, and also to obtain a stronger and better product.

With these and other objects in view, the invention includes the novel battery cell and process of making the same as hereinafter described and defined by the appended claims.

A cell constructed according to my invention and the core or mandrel for producing the same are illustrated in the accompanying drawings, in which:

Figure 1 is a perspective view of a cell in place upon a core or mandrel, the cell being shown partly broken away.

Fig. 2 is a perspective view of the bottom plate or member of the cell.

Fig. 3 is a perspective view of the core or mandrel; and

Fig. 4 is a central transverse vertical section through the mandrel and cell.

Referring by reference characters to these drawings, the numeral 1 designates a metal core or mandrel of a size and shape to correspond to the interior of the cell to be produced, having in one end wall thereof a plurality of parallel transverse slots $1^b$ of preferably tapered form as shown.

In proceeding according to my invention, I first pre-form in a suitable metal mold a cell bottom 2 (shown in Fig. 2) having transverse tapered ribs $2^a$ integral therewith, these ribs forming the cross bridges which are designed to support the contents of the cell, the cell bottom plate and ribs being partially vulcanized in its forming mold whereby the said plate and ribs are produced in a homogeneous and relatively stiff and unyielding condition.

The cell bottom as thus produced, is placed in inverted position on the top of the core or mandrel 1 with the ribs lying in the grooves $1^a$ which are properly shaped to receive them, as shown in Figs. 1 and 4. Thereafter, a sheet of rubber 3 of the requisite size and thickness is wrapped around the core or mandrel, with its edges abutting at one side as indicated at $3^a$, the upper edge of the sheet being folded over the margins of the cell bottom as indicated at $3^b$. The sheet is then rolled with a suitable hand roller to smooth out the rubber upon the mandrel and cause its edges $3^a$ to adhere to each other, and the overturned portions $3^b$ to adhere to the cell bottom. A reinforcing strip 4 of rubber is preferably applied across the bottom as shown in Fig. 1 and rolled to unite it to the bottom and its ends to the overturned edges of the rubber sheet. Thereafter, the whole is subjected to a vulcanizing heat to properly cure or vulcanize the rubber sheet and complete the vulcanization of the bottom, the whole being vulcanized into a complete unitary article.

By pre-forming the bottom as above described, stiff and strong bridges are produced, due to the integral union of the bridges with the base or bottom, and an effective union is also secured between the ends of the bridges and the cell walls as the partially vulcanized rubber of the ribs retains its proper position and unites firmly with the cell walls under the rolling action.

The cross bridges are therefore unlikely to break down or topple over under the cell contents and a strong and durable cell is secured. The core or mandrel is preferably made hollow and provided with air escape openings $1^b$ as shown in Fig. 4.

Having thus described my invention, what I claim is:

1. A hard rubber battery cell comprising a partially vulcanized bottom and cross bridges or ribs, and a cell wall vulcanized to said bottom.

2. The herein described method of making hard rubber battery cells which consists in applying cell walls to a cell bottom, which has been previously formed and partially vulcanized in a mold, and thereafter vulcanizing the whole together.

3. The herein described method of making hard rubber battery cells which consists in partially vulcanizing a cell bottom, thereafter applying the cell walls, and finally subjecting the whole to vulcanization.

In testimony whereof I affix my signature.

RAYMOND H. BLANCHARD.